United States Patent
Takagi et al.

(10) Patent No.: US 11,174,365 B2
(45) Date of Patent: Nov. 16, 2021

(54) FOAM PARTICLES AND FOAM PARTICLE MOLDED BODY

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 171 days.

(21) Appl. No.: 16/344,891

(22) PCT Filed: Nov. 2, 2017

(86) PCT No.: PCT/JP2017/039748
§ 371 (c)(1),
(2) Date: Apr. 25, 2019

(87) PCT Pub. No.: WO2018/084245
PCT Pub. Date: May 11, 2018

(65) Prior Publication Data
US 2019/0270861 A1 Sep. 5, 2019

(30) Foreign Application Priority Data

Nov. 4, 2016 (JP) .............................. JP2016-216371

(51) Int. Cl.
| | | |
|---|---|---|
| *C08J 9/232* | (2006.01) | |
| *C08J 3/20* | (2006.01) | |
| *C08J 9/18* | (2006.01) | |
| *C08J 9/16* | (2006.01) | |
| *B29B 9/12* | (2006.01) | |
| *B29B 7/00* | (2006.01) | |
| *B29B 9/06* | (2006.01) | |
| *B29C 44/34* | (2006.01) | |
| *B29K 23/00* | (2006.01) | |
| *B29K 96/04* | (2006.01) | |
| *B29K 105/00* | (2006.01) | |
| *B29K 105/04* | (2006.01) | |
| *B29K 105/24* | (2006.01) | |
| *B29B 7/38* | (2006.01) | |
| *B29C 44/00* | (2006.01) | |

(52) U.S. Cl.
CPC .............. *C08J 9/232* (2013.01); *B29B 7/007* (2013.01); *B29B 9/12* (2013.01); *C08J 3/201* (2013.01); *C08J 9/16* (2013.01); *C08J 9/18* (2013.01); *B29B 7/38* (2013.01); *B29B 9/06* (2013.01); *B29C 44/00* (2013.01); *B29C 44/3461* (2013.01); *B29K 2023/08* (2013.01); *B29K 2096/04* (2013.01); *B29K 2105/0085* (2013.01); *B29K 2105/04* (2013.01); *B29K 2105/24* (2013.01); *C08J 2203/06* (2013.01); *C08J 2203/22* (2013.01); *C08J 2205/044* (2013.01); *C08J 2323/08* (2013.01); *C08J 2353/00* (2013.01)

(58) Field of Classification Search
CPC ..... C08J 9/232; C08J 9/18; C08J 3/201; C08J 2323/14; C08J 9/16–18; C08J 3/24; C08J 3/248; C08J 2323/08; B29B 7/007; B29B 9/12

See application file for complete search history.

(56) References Cited

U.S. PATENT DOCUMENTS

| | | | | |
|---|---|---|---|---|
| 4,247,650 A | * | 1/1981 | Shimizu .................. | B29C 67/20 264/51 |
| 2006/0199872 A1 | * | 9/2006 | Prieto ........................ | C08J 9/00 521/142 |

FOREIGN PATENT DOCUMENTS

| | | |
|---|---|---|
| JP | H05-9329 A | 1/1993 |
| JP | H08-92407 A | 4/1996 |
| JP | 2008-533289 A | 8/2008 |
| JP | 2010-043195 A | 2/2010 |
| JP | 2013-064137 A | 4/2013 |
| JP | 2013-100555 A | 5/2013 |
| JP | 2015-108033 A | 6/2015 |
| JP | 2016-160300 A | 9/2016 |

OTHER PUBLICATIONS

Machine translation of JP 50091643 by Japan Styrene Paper. (Year: 1973).*
Derwent abstract of JP 50091643 by Japan Styrene Paper. (Year: 1973).*
"Initiator Half Life" by Polymer Properties Database. Accessed at http://polymerdatabase.com/polymer%20chemistry/t-half2.html on Dec. 21, 2020. (Year: 2020).*
International Search Report for PCT/JP2017/039748, dated Feb. 6, 2018, and English Translation submitted herewith (5 pages).

* cited by examiner

*Primary Examiner* — Michael M Dollinger
*Assistant Examiner* — Christina H. W. Rosebach
(74) *Attorney, Agent, or Firm* — Fitch, Even, Tabin & Flannery LLP

(57) ABSTRACT

The present invention is concerned with expanded beads of a block copolymer of a polyethylene block and an ethylene/α-olefin copolymer block, wherein a xylene insoluble fraction (A) of the expanded beads by a hot xylene extraction method is 10 to 70% by weight, and a ratio (A/B) of the xylene insoluble fraction (A) to a xylene insoluble fraction (B) of the expanded beads by a hot xylene extraction method when divided into two equal parts and measured is 1.0 to 1.1, and is able to provide expanded beads with excellent in-mold moldability and an expanded beads molded article with excellent fusion bondability and restorability.

7 Claims, No Drawings

FOAM PARTICLES AND FOAM PARTICLE MOLDED BODY

CROSS-REFERENCE TO RELATED APPLICATIONS

This application is a U.S. national phase application filed under 35 U.S.C. § 371 of International Application Number PCT/JP2017/039748, filed Nov. 2, 2017, designating the United States, which claims priority from Japanese Application Number 2016-216371, filed Nov. 4, 2016.

FIELD OF THE INVENTION

The present invention relates to expanded beads of a block copolymer of a polyethylene block and an ethylene/α-olefin copolymer block, and an expanded beads molded article thereof.

BACKGROUND ART BACKGROUND OF THE INVENTION

Expanded polyolefin-based resin beads can be molded into various shapes depending on purposes thereof. An expanded polyolefin-based resin beads molded article obtained from the expanded beads through in-mold molding is applied to a wide range of purposes including various kinds of a packaging or cushioning material, a shock absorber for automobiles, a building material, and the like. But, in the case of using a conventionally known polyolefin-based resin expanded beads molded article for purposes including a seat cushioning material, a pad material for sporting, a shoe sole material, and the like, there is a case where the polyolefin-based resin expanded beads molded article is insufficient in repulsion, flexibility, and restorability. Accordingly, novel expanded beads capable of replacing the expanded polyolefin-based resin beads were demanded. PTL 1 describes an expanded article containing an ethylene/α-olefin multi-block copolymer.

CITATION LIST

Patent Literature

PTL 1: JP 2008-533289 A

SUMMARY OF INVENTION

Technical Problem

However, though PTL 1 describes an expanded article containing an ethylene/α-olefin multi-block copolymer, an expanded beads molded article produced by molding expanded beads in a mold is not thoroughly reviewed.

Solution to Problem

Then, for the purposes of obtaining expanded beads with excellent in-mold moldability and in particular, obtaining an expanded beads molded article with excellent fusion bondability and restorability, the present inventors have found that the aforementioned problem can be solved by adopting the following constitutions, thereby leading to accomplishment of the present invention.

Specifically, the present invention is as follows.

[1] Expanded beads containing a block copolymer of a polyethylene block and an ethylene/α-olefin copolymer block, wherein a xylene insoluble fraction (A) of the expanded beads by a hot xylene extraction method is from 10 to 70% by weight, and a ratio (A/B) of the xylene insoluble fraction (A) to a xylene insoluble fraction (B) of the expanded beads by a hot xylene extraction method when divided into two equal parts and measured is from 1.0 to 1.1.

[2] The expanded beads as set forth in the above [1], wherein an apparent density of the expanded beads is from 30 to 500 kg/m$^3$.

[3] The expanded beads as set forth in the above [1] or [2], wherein an average cell diameter of the expanded beads is from 50 to 180 μm.

[4] The expanded beads as set forth in any one of the above [1] to [3], wherein a degree of swelling of the expanded beads is from 35 to 80.

[5] The expanded beads as set forth in any one of the above [1] to [4], wherein the xylene insoluble fraction (A) of the expanded beads by a hot xylene extraction method is from 30 to 70% by weight.

[6] An expanded beads molded article, which is obtained by molding the expanded beads as set forth in any one of the above [1] to [5] in a mold.

Advantageous Effects of Invention

In view of the fact that the expanded beads of a block copolymer of a polyethylene block and an ethylene/α-olefin copolymer block according to the present invention are in the state of a specified crosslinked state, the expanded beads according to the present invention are excellent in in-mold moldability. Furthermore, the expanded beads are able to provide an expanded beads molded article with excellent fusion bondability and restorability. In addition, the expanded beads molded article obtained by molding the expanded beads of the present invention in a mold is favorable especially in fusion bondability because the expanded beads constituting the molded article are firmly fusion-bonded to each other, and is excellent in restorability against contraction after molding.

DESCRIPTION OF EMBODIMENTS

Expanded Beads

The expanded beads of the present invention are expanded beads of a block copolymer of a polyethylene block and an ethylene/α-olefin copolymer block (hereinafter also referred to simply as "block copolymer (I)"). The expanded beads of the present invention are hereunder described in detail.

Xylene Insoluble Fraction (A) of Expanded Beads by Hot Xylene Extraction Method In the present invention, a xylene insoluble fraction (A) of the expanded beads by a hot xylene extraction method is 10 to 70% by weight. When the xylene insoluble fraction (A) is less than 10% by weight, the restorability of the expanded beads molded article obtained by molding the expanded beads in a mold becomes lower, and there is a concern that desired physical properties of the expanded beads molded article are not obtained. On the other hand, when the xylene insoluble fraction (A) is more than 70% by weight, the fusion bondability of the expanded beads is lowered, and it becomes difficult to produce an expanded beads molded article. From the aforementioned viewpoints, an upper limit of the xylene insoluble fraction (A) of the expanded beads is preferably 65% by weight, more preferably 55% by weight, and still more preferably 50% by weight. A lower limit of the xylene insoluble fraction (A) of the expanded beads is preferably 20% by weight, more preferably 30% by weight, still more preferably 35% by weight, and most preferably 40% by weight.

Xylene Insoluble Fraction (B) of Expanded Beads by Hot Xylene Extraction Method When Divided into Two Equal Parts and Measured In the expanded beads of the present invention, the ratio (A/B) of the xylene insoluble fraction (A) to a xylene insoluble fraction (B) of the expanded beads by a hot xylene extraction method when divided into two equal parts and measured is 1.0 to 1.1.

The xylene insoluble fraction (A) is a numerical value which is influenced mainly by a degree of crosslinking of a surface layer of the expanded bead and is a value reflecting the crosslinked state of the surface layer. Meanwhile, the xylene insoluble fraction (B) of the expanded beads when divided into two equal parts and measured is a numerical value which is influenced by a degree of crosslinking of each of the surface layer and the interior of the expanded bead and is a value reflecting the crosslinked state of each of the surface layer and the interior. In consequence, it is indicated that when the aforementioned ratio (A/B) is larger, the degree of crosslinking of the surface layer of the expanded bead is relatively higher, whereas the degree of crosslinking of the interior of the expanded bead is relatively lower. In the case where the ratio (A/B) is more than 1.1, after molding the expanded beads, the molded article is liable to be contracted. In addition, the contraction of the molded article is hardly restored, and it becomes difficult to obtain an expanded beads molded article with excellent restorability. In addition, in the case where the degree of crosslinking of the surface layer is high, the expanded beads are inferior in secondary expandability at the time of molding, and there is a concern that expanded beads with inferior fusion bondability are provided. From the aforementioned viewpoints, the ratio (A/B) is preferably 1.08 or less, and still more preferably 1.06 or less. Meanwhile, a lower limit of the ratio (A/B) is generally 1.

The wording "divided into two equal parts" as referred to herein means a state that the expanded bead is cut into approximately two equal parts (hereinafter sometimes referred to as "half segmented state"), and it is not always required that the expanded bead is precisely divided into two equal parts.

Measurement Method of Xylene Insoluble Fraction (A) and Xylene Insoluble Fraction (B) When Divided into Two Equal Parts, and Calculation of Ratio (A/B)

Approximately 1.00 g of expanded beads are weighed and defined as a sample weight W1. The weighed expanded beads are put into a 150-mL round bottom flask; 100 mL of xylene is added; the contents are heated for refluxing by boiling the xylene with a mantle heater for 6 hours; thereafter, a residue left undissolved is filtered with a 100-mesh metallic mesh and separated; and a weight W2 of an extraction residue containing xylene in a swollen state is measured. Subsequently, the residue is dried with a vacuum drier at 80° C. for 8 hours, and a weight W3 of the resulting dry product is measured. A weight percentage of this weight W3 to the sample weight W1 [(W3/W1)×100] (%) is defined as the xylene insoluble fraction (A).

With respect to a sample obtained by cutting the expanded bead into two parts in a halved state passing through a central part, the xylene insoluble fraction (B) is measured in the same manner as in the measurement method of the xylene insoluble fraction (A).

In the case where the degree of crosslinking of the surface layer is high, in view of the fact that in the extraction step, xylene hardly comes into the interior, there is a tendency that the value of the xylene insoluble fraction (A) relative to the xylene insoluble fraction (B) becomes large.

Degree of Swelling (S) of Expanded Beads by Hot Xylene Extraction Method

A degree of swelling (S) of the expanded beads of the present invention, which can be determined on a basis of a hot xylene extraction method as mentioned later, is preferably 35 to 80.

The degree of swelling is a numerical value related to a crosslinked state of the block copolymer (I), in particular, a crosslinking density. When the degree of swelling falls within the aforementioned range, the secondary expandability of the expanded beads becomes favorable, and an expanded beads molded article with excellent fusion bondability can be obtained.

In the present invention, the degree of swelling (S) is a weight ratio [(W2/W3)] of the residue weight W2 by the hot xylene extraction to the dry product weight W3, and an upper limit of the degree of swelling (S) is preferably 80, and more preferably 75. In addition, a lower limit of the degree of swelling (S) is preferably 35, and more preferably 40.

Measurement Method of Degree of Swelling (S)

On the occasion of measuring the xylene insoluble fraction (A) on a basis of the previously mentioned method, the residue weight W2 and the dry product weight W3 are measured, and the weight ratio [(W2/W3)] of the residue weight W2 to the dry product weight W3 is defined as the degree of swelling (S).

Apparent Density of Expanded Beads

An upper limit of an apparent density of the expanded beads of the present invention is preferably 500 kg/$m^3$, more preferably 300 kg/$m^3$, still more preferably 200 kg/$m^3$, and especially preferably 180 kg/$m^3$. A lower limit of the apparent density of the expanded beads of the present invention is preferably 30 kg/$m^3$, more preferably 60 kg/$m^3$, and especially preferably 80 kg/$m^3$. By allowing the apparent density of the expanded beads to fall within the aforementioned range, lightweight properties, flexibility, and repulsion of the expanded beads molded article produced by molding the expanded beads in a mold can be made more favorable.

The apparent density of the expanded beads can be measured in the following manner.

Expanded beads whose weight W (g) has been weighed in advance and having a bulk volume of approximately 50 mL are immersed in a 200-mL measuring cylinder having 100 mL of ethanol charged therein by using a metallic mesh or the like, and a volume V (mL) of an elevation of the liquid level of ethanol is read. W/V is determined and expressed in terms of a unit, thereby defining the apparent density (kg/$m^3$) of the expanded beads.

Average Bead Diameter of Expanded Beads

An upper limit of an average bead diameter of the expanded beads of the present invention is preferably 10 mm, more preferably 8 mm, and still more preferably 5 mm. In addition, a lower limit of the average bead diameter of the expanded beads of the present invention is preferably 0.5 mm, more preferably 1 mm, and still more preferably 2 mm. When the average bead diameter of the expanded beads falls within the aforementioned range, not only the production of the expanded beads is easy, but also when the expanded beads are molded in a mold, the filling properties into a mold are improved. The average bead diameter of the expanded beads can be, for example, controlled by regulating the amount of a blowing agent, an expansion condition, a particle diameter of resin particles, and the like.

Average Cell Diameter of Expanded Beads

In the expanded beads of the present invention, an average cell diameter is preferably 50 to 180 μm. When the average cell diameter falls within the aforementioned range, the matter that the cells of the expanded beads are broken by heating at the time of in-mold molding, resulting in lowering of the secondary expandability is not caused, and the expanded beads become excellent in fusion bondability. From the aforementioned viewpoints, an upper limit of the average cell diameter is more preferably 170 μm, still more preferably 160 μm, and most preferably 150 μm. A lower limit of the average cell diameter is more preferably 60 μm, still more preferably 70 μm, and most preferably 80 μm.

Measurement of Average Cell Diameter of Expanded Beads

In the present invention, the average cell diameter of the expanded beads is measured on a basis of ASTM D3576-77 as follows.

A cut surface obtained by dividing the expanded bead into approximately two parts is photographed with a scanning electron microscope. In the resulting cross-sectional photograph, a straight line is drawn at equal intervals in the eight directions from the vicinity of the center of the cut surface in the expanded bead, and the number of all cells intersecting the straight lines is counted. A value obtained by dividing a total length of the straight lines by the number of cells counted is defined as an average chord length of cell. Furthermore, by dividing the average chord length by 0.616, the cell diameter of the expanded beads is calculated. This operation is performed with respect to at least 30 or more expanded beads, and an arithmetic average value of the cell diameter of each of the expanded beads is defined as the average cell diameter.

In the measurement of the cell diameter of each of the expanded beads, even when a part of a cell intersects the straight line, such a cell is also counted. In addition, the reason why in the measurement, a straight line is drawn at equal intervals in the eight directions from the vicinity of the center of the cut surface in the expanded bead resides as follows. This is because as for one in which a straight line is drawn at equal intervals in the eight directions from the vicinity of the center of the cut surface in the expanded bead, even if a shape of the measured cell is different depending upon the direction on the cut surface in the expanded bead, a scattering is small, and a stable value of the cell diameter is obtained.

The expanded beads molded article of the present invention is composed of expanded beads of the block copolymer (I) of a polyethylene block and an ethylene/α-olefin copolymer block.

Block Copolymer (I)

The block copolymer (I) has a polyethylene block and an ethylene/α-olefin copolymer block.

The polyethylene block is corresponding to a hard block, and the ethylene/α-olefin copolymer block is corresponding to a soft block. It is preferred that the polyethylene block and the ethylene/α-olefin copolymer block are linearly configured. Furthermore, it is preferred that a third block is not contained.

A proportion of a component of a structural unit derived from ethylene in the polyethylene block is preferably more than 95% by weight, and more preferably more than 98% by weight relative to the weight of the polyethylene block. Meanwhile, in the ethylene/α-olefin copolymer block, a proportion of a component of a structural unit derived from the α-olefin is preferably more than 5% by weight, more preferably more than 10% by weight, and still more preferably more than 15% by weight relative to the weight of the ethylene/α-olefin copolymer block.

A proportion of the ethylene/α-olefin copolymer block in the block copolymer (I) is preferably 1 to 99% by weight, and more preferably 5 to 95% by weight relative to the weight of the block copolymer (I). The proportion of the polyethylene block and the proportion of the ethylene/α-olefin copolymer block can be calculated on a basis of data obtained by means of differential scanning colorimetry (DSC) or nuclear magnetic resonance (NMR).

The ethylene/α-olefin copolymer block in the block copolymer (I) is preferably a block of a copolymer of a $C_3$-$C_{20}$ α-olefin and ethylene. In the ethylene/α-olefin copolymer block, examples of the α-olefin which is copolymerized with ethylene include propylene, 1-butene, 1-pentene, 1-hexene, 1-heptene, 1-octene, 1-nonene, 1-decene, 3-methyl-1-butene, and 4-methyl-1-pentene, and these can be used in combination. From the viewpoints of easiness of industrial availability, various characteristics, economy, and so on, examples of the α-olefin which is copolymerized with ethylene include propylene, 1-butene, 1-hexene, and 1-octene, with 1-octene being especially preferred.

Although the block copolymer (I) may be of any of a diblock structure, a triblock structure, and a multi-block structure, in particular, it is preferably of a multi-block structure. Examples of the multi-block copolymer include the ethylene/α-olefin copolymer described in PTL 1. In addition, examples of the commercially available products of the multi-block copolymer include "INFUSE", a trade name, manufactured by The Dow Chemical Company.

The block copolymer (I) can be produced by using a known polymerization method using a known catalyst for olefin polymerization.

Characteristics of Block Copolymer (I)

An upper limit of a melt flow rate at 190° C. and a load of 2.16 kg of the block copolymer (I) can be selected from a range of preferably 10 g/10 min, more preferably 8 g/10 min, and still more preferably 7 g/10 min. In addition, a lower limit of the foregoing melt flow rate can be selected from a range of preferably 2 g/10 min, more preferably 3 g/10 min, and still more preferably 4 g/10 min. When the melt flow rate falls within the aforementioned range, the fusion bondability of the expanded beads of the block copolymer (I) is favorable. In addition, the restorability of the expanded beads molded article obtained by molding the expanded beads also becomes excellent. This melt flow rate is a value of the multi-block copolymer (I) before a crosslinking step as mentioned later, which is measured under a condition at a temperature of 190° C. and a load of 2.16 kg in conformity with JIS K7210-1 (2014).

An upper limit of a density of the block copolymer (I) is preferably 1,000 kg/m$^3$, more preferably 950 kg/m$^3$, and still more preferably 900 kg/m$^3$. In addition, a lower limit of the density of the block copolymer (I) is 700 kg/m$^3$, more preferably 800 kg/m$^3$, and still more preferably 850 kg/m$^3$.

A melting point of the block copolymer (I) is preferably 110 to 150° C., and more preferably 115 to 140° C. When the melting point of the block copolymer (I) falls within the aforementioned range, the restorability and heat resistance after molding at a high temperature becomes excellent. The melting point of the block copolymer (I) is measured on a basis of the heat flux differential scanning calorimetry described in JIS K7121 (1987). Specifically, the block copolymer (I) is heated from 30° C. to 200° C. at a temperature rise rate of 10° C./min, then cooled to 30° C. at a cooling rate of 10° C./min, and again heated from 30° C. to 200° C. at a temperature rise rate of 10° C./min to provide a DSC curve, and the melting point can be obtained from a peak temperature of an endothermic peak determined by the DSC curve. In the case where plural endothermic peaks appear in the DSC curve for the aforementioned second heating, the peak temperature of the endothermic peak having a largest area is designated as the melting point.

An upper limit of a flexural modulus of the block copolymer (I) is preferably 100 MPa, more preferably 50 MPa, and still more preferably 40 MPa. In addition, a lower limit of the foregoing flexural modulus is preferably 10 MPa, more preferably 12 MPa, and still more preferably 15 MPa. The flexural modulus of the block copolymer (I) is a value measured in conformity with the measurement method described in JIS K7171 (2008).

Additional Additive

In the block copolymer (I), an additional additive can be added within a range where the object and effects of the present invention are not impaired. Examples of the additional additive include an antioxidant, an ultraviolet ray inhibitor, an antistatic agent, a flame retardant, a flame retarding assistant, a metal deactivator, and a conductive filler.

A total amount of these additives is preferably 20 parts by weight or less, more preferably 10 parts by weight or less, and still more preferably 5 parts by weight or less based on 100 parts by weight of the block copolymer (I). These additives are generally used in the requisite minimum amounts. In addition, these additives can be contained in polymer particles in such a manner that on the occasion of producing the polymer particles, the additives are added and kneaded in an extruder together with the block copolymer (I).

The block copolymer (I) may contain an additional polymer other than the block copolymer (I) within a range where the object and effects of the present invention are not impaired. Examples of the additional polymer other than the block copolymer (I) include a thermoplastic resin, such as a polyolefin-based resin (for example, a polyethylene-based resin, a polypropylene-based resin, and a polybutene-based resin) and a polystyrene-based resin; and other thermoplastic elastomer. A blending proportion of the additional polymer is preferably 10 parts by weight or less, and more preferably 5 parts by weight or less based on 100 parts by weight of the block copolymer (I), and it is especially preferred that the block copolymer (I) is composed of only the block copolymer (I).

As the production method of the expanded beads, for example, there is exemplified a method in which the block copolymer (I), a crosslinking agent, and a blowing agent are fed into an extruder and melt kneaded to crosslink the block copolymer (I); the crosslinked block copolymer (I) is then extruded and expanded from a die installed in an apex of the extruder, to produce a crosslinked expanded product of the block copolymer (I); and the expanded product is cooled and then pelletized for cutting in a bead form. In addition, there is exemplified a method in which expandable crosslinked particles obtained through processes (A) to (B) as mentioned later are taken out from a closed vessel and dehydrated for drying, and the expandable crosslinked particles are then heated for expansion with a heating medium to form the expanded beads. Furthermore, there is exemplified a method in which expandable crosslinked particles obtained through (A) to (B) are released from a closed vessel and expanded to obtain expanded particles. Moreover, while the method of crosslinking the polymer particles with an organic peroxide has been described above, the crosslinking treatment in the present invention is not limited to the use of an organic peroxide, and other known methods can also be used, for example, the crosslinked particles or the expanded beads can be obtained through a crosslinking treatment using an electron beam crosslinking method or the like.

The expanded beads which are used in the present invention, in particular, are produced by a method including a process of producing non-expanded beads obtained in a process (A) as mentioned later. It is preferred that the expanded beads are produced by a process (B) including a crosslinking step of the non-expanded beads, an impregnation step of a blowing agent, and an expansion step.

Process (A): Steps of Kneading and Granulation of Block Copolymer (I)

Block copolymer (I) particles (hereinafter sometimes referred to as "polymer particles") are produced by a known method, such as a method in which the block copolymer (I) is fed into an extruder and kneaded to form a molten kneaded material, the molten kneaded material is extruded in a strand form from the extruder, and the strand is cut into a size suitable for forming the expanded beads. For example, the polymer particles of a target particle weight can be obtained in such a manner that in the aforementioned method, the molten kneaded material having been extrusion-molded in a strand form is cooled by means of water cooling and then cut into a predetermined length.

In view of the fact that the molten kneaded material of the block copolymer (I) is soft, an underwater cutting method (UWC) in which the molten kneaded material is cut in water can be adopted.

An average weight per one polymer particle is preferably 0.8 to 10 mg, more preferably 1 to 8 mg, still more preferably 2 to 7 mg, most preferably 4 to 6 mg. The polymer particles may contain known additives, such as a flame retardant, a flame retarding assistant, a plasticizer, an antistatic agent, an antioxidant, an ultraviolet ray absorber, a photostabilizer, a conductive filler, and an antibacterial agent. In addition, it is preferred that a cell controlling agent is contained depending upon the polymer particles. Such an additive can be added in a step of obtaining the polymer particles at the time of kneading of the process (A). The weight of the polymer particles and the weight of the expanded beads are substantially identical with each other.

Expanded beads having target average cell diameter and average surface layer thickness are obtained by changing an expansion condition, such as the kind and addition amount of the cell controlling agent, an expansion method, an expansion temperature, the amount of a blowing agent, and an expansion atmosphere, and characteristics of the resin, or other means. For example, when the addition amount of the cell controlling agent (cell nucleating agent) is increased, the amount of the cell nucleus increases, and therefore, there is a tendency that the cell of the expanded bead becomes small, and the cell membrane thickness of the expanded bead becomes thin. When a cell controlling agent containing a hydrate, such as zinc borate, is used, hydrated water acts on the expansion, and therefore, there is a tendency that the cell diameter of the expanded bead becomes large.

Process (B): Steps of Crosslinking of Polymer Particles, Impregnation of Blowing Agent, and Expansion In the process (B), the polymer particles are dispersed together with a crosslinking agent in a dispersing medium, such as water, in a closed vessel, such as an autoclave, the dispersion is heated under agitation to soften and crosslink the polymer particles. In addition, in the aforementioned process, a blowing agent is impregnated to obtain expandable particles. Then, the expandable particles are expanded to obtain expanded beads.

Dispersing Medium

The dispersing medium to be used for production of expanded beads which are used for the expanded beads molded article of the present invention is not particularly limited so long as it is a dispersing medium which does not dissolve the polymer particles therein. Examples of the dispersing medium include water, ethylene glycol, glycerin, methanol, and ethanol. The dispersing medium is preferably water.

In the process (B), a dispersant may be further added to the dispersing medium. Examples of the dispersant include an organic dispersant, such as polyvinyl alcohol, polyvinylpyrrolidone, and methyl cellulose, and a sparingly soluble inorganic salt, such as aluminum oxide, zinc oxide, kaolin, mica, magnesium phosphate, and tricalcium phosphate. In addition, a surfactant can be further added to the dispersing medium. Examples of the surfactant include sodium oleate and sodium dodecylbenzenesulfonate, and also include an anionic surfactant and a nonionic surfactant that are generally used in suspension polymerization.

Crosslinking Agent and Crosslinking

In the process (B), a crosslinking agent can be used for the purpose of crosslinking the polymer particles. The crosslinking agent may be added to the dispersing medium in advance, and may also be added to the dispersing medium after dispersing the polymer particles in the dispersing medium. The crosslinking agent is not particularly limited so long as it is able to crosslink the block copolymer (I). As the crosslinking agent, a conventionally known organic peroxide which is used for crosslinking a polyethylene-based resin can be used. Examples thereof include a Percumyl-based compound, such as dicumyl peroxide and tert-butylcumyl peroxide; a Perbutyl-based compound, such as 1,1-bis(tert-butylperoxy)-3,3,5-trimethylcyclohexane, 2,5-dimethyl-2,5-di(tert-butylperoxy)hexane, and di-tert-butyl peroxide; a Perhexyl-based compound, such as tert-hexylperoxybenzoate; and a Perocta-based compound, such as 1,1,3,3-tetramethylbutylperoxy-2-ethylhexanoate. Of these, a Percumyl-based compound and a Perbutyl-based compound are preferred, and dicumyl peroxide is more preferred. These can be used either alone or in combination of two or more thereof. A blending amount of the crosslinking agent is preferably 0.1 to 8 parts by weight, and more preferably 0.2 to 5 parts by weight based on 100 parts by weight of the block copolymer (I) (polymer particles).

When the blending amount of the crosslinking agent falls within the aforementioned range, crosslinked particles having an appropriate xylene insoluble fraction are obtained, and the crosslinked particles can be thoroughly expanded. In addition, the crosslinked particles have a strength such that on the occasion of expansion, the cell wall forming a cell is able to thoroughly withstand the expansion.

It is preferred that the crosslinking reaction is performed at a temperature equal to or higher than a temperature at which the block copolymer (I) composing the polymer particles having been dispersed in the dispersing medium is softened, and the crosslinking agent is substantially decomposed, specifically at a temperature equal to or higher than not only a one-hour half-life temperature of the organic peroxide but also a melting point of the block copolymer (I). The crosslinking reaction of the block copolymer (I) is preferably performed while holding at this temperature for 1 minute to 200 minutes.

With respect to the crosslinked state of the expanded beads (crosslinked state of the surface layer and the interior), the impregnation step of the crosslinking agent is also related thereto. For example, it may be considered that the crosslinked state can be regulated by a charge ratio of the raw material and the dispersing medium in the crosslinking step, an impregnation time, an impregnation temperature, the kind of the crosslinking agent, and the like.

Expandable Particles

It is preferred that the blowing agent for expanding the crosslinked particles is added to the dispersing medium in the closed vessel, and the blowing agent is then impregnated in the crosslinked particles in a softened state, to prepare expandable crosslinked particles. Although a temperature for impregnating the blowing agent is not particularly limited so long as it is a temperature equal to or higher than a temperature at which the crosslinked particles become in a softened state, for example, it is preferably in a range of 100 to 180° C. An upper limit thereof is more preferably 170° C., and still more preferably 165° C. In addition, a lower limit thereof is more preferably 130° C., and still more preferably 140° C.

Blowing Agent

The blowing agent to be used is not particularly limited so long as it is able to expand the crosslinked particles. Examples of the blowing agent include an inorganic physical blowing agent, such as air, nitrogen, carbon dioxide, argon, helium, oxygen, and neon; and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical blowing agent is preferred because it does not deplete the ozone layer and is inexpensive; nitrogen, air, and carbon dioxide are more preferred; and carbon dioxide is especially preferred. These blowing agents can be used either alone or in combination of two or more thereof. Although a blending amount of the blowing agent is determined in consideration of an apparent density of the target expanded beads, the kind of the block copolymer (I), the kind of the blowing agent, and the like, in general, it is preferred to use 2 to 20 parts by weight of the organic physical blowing agent, or to use 0.5 to 20 parts by weight of the inorganic physical blowing agent, based on 100 parts by weight of the block copolymer (I). The aforementioned respective steps of crosslinking, impregnation of a blowing agent, and expansion are preferably performed as a series of steps in the same closed vessel.

Production of Expanded Beads

The expandable crosslinked particles having been impregnated with the blowing agent and heated are released to an atmosphere having a pressure that is lower than the pressure within the closed vessel, to produce expanded beads. Specifically, while holding the pressure in the closed vessel at a pressure equal to or higher than a vapor pressure of the blowing agent, one end of the closed vessel under the water surface is opened to release the expandable crosslinked particles containing the blowing agent together with the dispersing medium from the interior of the closed vessel to an atmosphere having a pressure that is lower than the pressure in the closed vessel, generally to an atmospheric pressure. The expandable crosslinked particles are then expanded (hereinafter also referred to as "direct expansion method"), thereby producing the expanded beads.

By attaching an anionic surfactant to the surfaces of the expanded beads which are used for the expanded molded article of the present invention, the fusion bondability at the time of in-mold molding can be more improved. Examples of the anionic surfactant include a carboxylic acid type, a sulfonic acid type, a sulfate ester type, a phosphate ester type, and a polymer type. In particular, among the aforementioned anionic surfactants, an alkanesulfonate salt, a polyacrylate salt, or a salt of a polyacrylic acid-sulfonic acid copolymer is preferably attached to the surfaces of the expanded beads because expanded beads which are excellent in an effect for improving the fusion bondability at the time of in-mold molding are obtained. In addition, the anionic surfactant can be used either alone or in admixture of two or more thereof.

An attached amount of the anionic surfactant to the expanded beads per unit surface area is preferably 2 mg/m$^2$ or more, more preferably 5 mg/m$^2$ or more, and especially preferably 20 mg/m$^2$ or more. On the other hand, an upper limit of the foregoing attached amount per unit surface area is generally 100 mg/m$^2$ or less. In addition, as for a coated amount of the anionic surfactant onto the expanded beads, a value obtained through calculation on a basis of a value measured with a TOC (total organic carbon) measuring device can be adopted. The measurement of TOC can be performed with a total organic carbon analyzer, manufactured by Shimadzu Corporation (a trade name: TOC-VCSH). Since a total carbon (TC) in water is composed of total organic carbon (TOC) and inorganic carbon (IC) that is a carbon component, there is a relation of TC equals TOC plus IC, and thus, TOC equals TC minus IC. Accordingly, TOC can be determined by the TC-IC method.

Expanded Beads Molded Article

The expanded beads molded article can be obtained by molding the expanded beads of the present invention in a mold.

In-Mold Molding

The expanded beads molded article can be obtained by filling the expanded beads in a mold and heating with a heating medium, such as steam, for molding, according to a conventionally known method.

Specifically, the expanded beads are filled in a mold, and the expanded beads are then heated and expanded by introducing a heating medium, such as steam, into the mold. The expanded beads are then molded to fusion-bond to each other, whereby the expanded beads molded article in which the shape of a molding space is shaped can be obtained.

The in-mold molding in the present invention is preferably performed by a pressure molding method (see, for example, JP 51-22951 B) in which the expanded beads are subjected in advance to a pressure treatment with a pressurized gas, such as air, to increase the pressure inside the expanded beads, thereby controlling the pressure inside the expanded beads to 0.01 to 0.2 MPa(G) (G means the gauge pressure); the expanded beads are then filled in a cavity of a mold under an atmospheric pressure or reduced pressure, followed by closing the mold; and subsequently, a heating medium, such as steam, is fed into the mold, thereby molding the expanded beads through fusion bonding thereof with heat. In addition, the in-mold molding can be performed by a compression filling molding method (see JP 4-46217 B) in which a cavity pressurized with a compressed gas to an atmospheric pressure or more is filled with expanded beads pressurized to the foregoing pressure or more; and a heating medium, such as steam, is then fed into the cavity for heating, thereby molding the expanded beads through fusion bonding thereof with heat. Besides, the in-mold molding can also be performed by an ambient pressure filling molding method (see JP 6-49795 B) in which expanded beads obtained under a special condition and having a high secondary expansion force are filled in a cavity of a mold of a male and female pair under an atmospheric pressure or reduced pressure; and a heating medium, such as steam, is then fed thereinto for heating, thereby molding the expanded beads through fusion bonding thereof with heat, or a method through a combination of the aforementioned methods (see JP 6-22919 B), or the like.

In the specific in-mold molding of the expanded beads molded article of the present invention, in the case of filling the expanded beads such that a ratio of cracking in the mold is 10 to 250% by volume, and preferably 15 to 220% by volume, in view of the fact that the specified weight of expanded beads and number of expanded beads on the surface of the molded article are satisfied, an expanded beads molded article satisfying both the fusion bondability and the surface properties can be obtained.

The cracking is explained. On the occasion of filling the expanded beads in a cavity of a mold, for the purpose of efficiently filling the expanded beads in an amount of more than the cavity volume, an open portion of the mold so as to not completely close the mold is called "cracking". The cracking is expressed as a ratio (%) of a volume of the open portion to a cavity volume of the mold. After filling the expanded beads in the mold, on the occasion of introducing steam, the cracking is finally closed, and as a result, the filled expanded beads are compressed.

Molding Density of Expanded Beads Molded Article

An upper limit of a molding density of the expanded beads molded article of the present invention is preferably 300 kg/m$^3$, more preferably 250 kg/m$^3$, still more preferably 200 kg/m$^3$, and especially preferably 180 kg/m$^3$. A lower limit of the molding density is preferably 40 kg/m$^3$, more preferably 45 kg/m$^3$, still more preferably 50 kg/m$^3$, and especially preferably 55 kg/m$^3$. When the molding density of the expanded beads molded article falls within the aforementioned range, an expanded beads molded article which is well-balanced and excellent in lightweight properties, flexibility, repulsion, restorability, and tensile characteristics is revealed. The molding density (kg/m$^3$) of the expanded beads molded article is determined by dividing a mass W (g) of the molded article by a volume V (W/V) thereof.

Tensile Elongation at the Time of Elongation

A cut-out piece was produced in conformity with JIS K6767 (1999) by cutting the expanded beads molded article in a size of 120 mm×25 mm×10 mm with a vertical slicer such that all the surfaces thereof were cut surfaces. Subsequently, the cut-out piece was cut out with a jig saw into a No. 1 dumbbell form (having a measurement portion having a length of 40 mm, a width of 10 mm, and a thickness of 10 mm), to produce a test piece. The test piece was subjected to a tensile test at a test speed of 500 mm/min, and a maximum load during that time and a gauge length at the time of cutting were measured. A maximum tensile stress at the time of drawing is defined as a tensile strength, and an elongation at the time of breakage is defined as a tensile elongation.

The expanded beads obtained by the present invention are excellent in fusion bondability on the surfaces of the expanded beads, and therefore, a molded article in which the expanded beads are firmly fusion-bonded to each other is revealed, and tensile physical properties of the molded article are especially improved. From the aforementioned viewpoint, the tensile elongation is preferably 90% or more, more preferably 100% or more, and still more preferably 150% or more. An upper limit thereof is generally 500%.

Restorability

A thickness of each of an edge part (a portion inside from the edge by 10 mm) and a central part (a portion equally dividing in both the longitudinal direction and the transverse direction) in the expanded beads molded article corresponding to a dimension of a flat plate mold used for in-mold molding and having a length of 250 mm, a width of 200 mm, and a thickness of 20 mm is measured with a ruler with respect to 10 points, i.e., 10 samples in total. Subsequently, a thickness ratio of the expanded beads molded article is calculated as an average value according to the following expression.

(Thickness in central part of molded article)/(Thickness in edge part of molded article)×100(%)

In view of the fact that one in which the crosslinked state of the expanded beads is biased toward the surface layer rather than the interior of the expanded bead is inferior in restorability of the interior of the expanded bead, the thickness ratio becomes low, and there is a concern that the restorability of the expanded beads molded article becomes inferior. From the aforementioned viewpoint, the thickness ratio of the expanded beads molded article is preferably 90% or more, and more preferably 95% or more.

EXAMPLES

Next, the present invention is described in more detail by reference to Examples, but it should be construed that the present invention is by no means limited by these Examples.

Evaluation

The expanded beads and the expanded beads molded articles used in the Examples and Comparative Examples were evaluated in the following manners.

Apparent Density of Expanded Beads

The measurement was performed by the aforementioned method.

Average Cell Diameter of Expanded Beads

With respect to 30 expanded beads, the measurement was performed by the aforementioned method, thereby determining an arithmetic average value.

Xylene Insoluble Fraction of Expanded Beads

The xylene insoluble fraction (A) and the xylene insoluble fraction (B) of the expanded beads divided into two equal parts were measured by the aforementioned boiling hot xylene extraction method.

Degree of Swelling of Expanded Beads

The measurement was performed by the aforementioned boiling hot xylene extraction method.

Appearance (Number of Voids)

As for the evaluation of surface appearance, the expanded beads molded article was cut out in a range of 100 mm×100 mm from a central part thereof, to produce a test piece; lines were drawn on the diagonal from corners of the test piece; and the number of voids having a size of 1 mm×1 mm or more on the lines were counted and evaluated according to the following criteria.

A; The number of voids is less than 5.
B: The number of voids is 5 or more and less than 10.
C: The number of voids is 10 or more.

The degree of voids among the expanded beads on the molded article surface is related to the secondary expandability of the expanded beads. There is a tendency that the higher the secondary expandability of the expanded beads, the smaller the number of voids on the molded article surface. As compared with the xylene insoluble fraction (A), in the case where the xylene insoluble fraction (B) measured in a half segmented state is too low, the crosslinkage is formed biased toward the surface layer rather than the interior of the expanded bead. In consequence, the expanded beads are inferior in secondary expandability, and there is a concern that a void is formed on the molded article surface. From the aforementioned viewpoint, it is preferred that the number of voids on the expanded beads molded article surface is less than 5.

Moldable Range

In the following Examples 1 to 7 and Comparative Examples, molding was performed under a condition at a molding pressure of 0.20 MPa (G) and besides, at a molding pressure of 0.16 MPa (G) and 0.24 MPa (G), respectively. As for a condition under which a favorable molded article having a tensile elongation of 150% or more, a restorability of 90% or more, and the number of voids of less than 5, a moldable molding pressure range was evaluated according to the following criteria.

A: A favorable molded article is obtained at a molding pressure of 0.16, 0.20, and 0.24 MPa (G), respectively.
B1: A favorable molded article is obtained at a molding pressure of 0.16 and 0.20 MPa (G), respectively.
B2: A favorable molded article is obtained at a molding pressure of 0.20 and 0.24 MPa (G), respectively.
C: A favorable molded article is obtained at a molding pressure of 0.20 MPa (G).
D: A favorable molded article is not obtained at all of molding pressures.

From the viewpoints of productivity, energy saving properties, production stability, and the like, it is preferred that the expanded beads can be molded at a lower molding pressure (temperature) and in a wider molding pressure range.

Example 1

Production of Particles of Block Copolymer (I)

Using, as a block copolymer (I), a multi-block copolymer (INFUSE™ Olefin Block Copolymer (OBC) 9530, manufactured by The Dow Chemical Company) having a melting point of 120° C., a melt flow rate of 5.4 g/10 min (at 190° C. and a load of 2.16 kg), a density of 887 kg/m$^3$, a type A durometer hardness of 86, and a flexural modulus of 28 MPa and having a polyethylene block and an ethylene/α-olefin block, 1,000 ppm by weight of zinc borate (manufactured by Tomita Pharmaceutical Co., Ltd., Zinc Borate 2335, average particle diameter: 6 μm) as a cell controlling agent was added to 100 parts by weight of the multi-block copolymer, and the contents were put into an extruder and melt kneaded. The resultant was extruded in a strand form from a ϕ2-mm die, cooled in water, and then cut in a particle weight of approximately 5 mg by using a pelletizer, followed by granulation to obtain particles of the block copolymer (I).

Production of Expanded Beads 50 kg of the resulting particles of the block copolymer (I) (polymer particles) were blended with 200 liters of water as a dispersing medium, 300 g of kaolin as a dispersant, 8 g of a sodium alkylbenzenesulfonate, and 0.7 part by weight of dicumyl peroxide as a crosslinking agent based on 100 parts by weight of the polymer particles and charged in a closed vessel (autoclave) having a capacity of 400 L together with 0.4 MPa (G) of carbon dioxide ($CO_2$) as a blowing agent. A ratio of the weight of the polymer particles to the weight of water is 0.25. The temperature was then raised to 110° C. that is the crosslinking agent impregnation temperature under agitation and held for impregnation for 30 minutes. Thereafter, the temperature was raised to 160° C. that is the crosslinking and expansion temperature and held for 30 minutes. The contents were then released under an atmospheric pressure to obtain expanded beads. At this time, the pressure in the vessel (equilibrium vapor pressure) was 1.9 MPa (G).

Production of Expanded Beads Molded Article

The resulting expanded beads were charged in a closed vessel and pressurized with compressed air of 0.2 MPa (G) for 12 hours to impart an internal pressure of 0.10 MPa (G) within the expanded beads. After taking out the expanded beads having an internal pressure imparted thereto, in-mold molding was performed in such a manner that the taken-out expanded beads were filled in a flat plate mold having a length of 250 mm, a width of 200 mm, and a thickness of 20 mm such that a ratio of cracking was 20%; the mold was closed, heated with steam of 0.2 MPa (G), and then cooled, followed by performing in-mold molding by taking out a molded article from the mold. Furthermore, the expanded beads molded article was heated for drying and aged within an oven adjusted at 60° C. for 12 hours and then taken out, thereby obtaining an expanded beads molded article. The molding density of the resulting molded article, the physical properties of the molded article, the properties of the expanded beads, the various conditions, and the like are shown in Table 1.

With respect to the following Examples and Comparative Examples, the evaluations were performed in the same manners, and the results are shown in Table 1 together with the various conditions.

Example 2

Expanded beads and an expanded beads molded article were produced in the same manners as in Example 1, except that on the occasion of producing expanded beads, 0.6 part by weight of dicumyl peroxide as the crosslinking agent was charged based on 100 parts by weight of the polymer particles together with $CO_2$ as the blowing agent at a pressure of 1.4 MPa (G), and the pressure in the vessel at the time of expansion was regulated to 2.6 MPa (G).

Example 3

Expanded beads and an expanded beads molded article were produced in the same manners as in Example 1, except that on the occasion of producing expanded beads, 0.8 part by weight of dicumyl peroxide as the crosslinking agent was charged based on 100 parts by weight of the polymer particles together with $CO_2$ as the blowing agent at a pressure of 1.6 MPa (G), and the pressure in the vessel at the time of expansion was regulated to 4.0 MPa (G).

Example 4

Expanded beads and an expanded beads molded article were produced in the same manners as in Example 1, except that on the occasion of producing expanded beads, $CO_2$ as the blowing agent at a pressure of 1.4 MPa (G) was charged, and the pressure in the vessel at the time of expansion was regulated to 2.6 MPa (G).

Example 5

Expanded beads and an expanded beads molded article were produced in the same manners as in Example 1, except that on the occasion of producing expanded beads, 1 kg of the polymer particles obtained in Example 1 was blended with 3 liters of water as the dispersing medium, 3 g of kaolin as the dispersant, 0.04 g of a sodium alkylbenzenesulfonate, and 0.8 part by weight of dicumyl peroxide as the crosslinking agent based on 100 parts by weight of the polymer particles and charged in a closed vessel having a capacity of 5 L together with $CO_2$ as the blowing agent at a pressure of 0.4 MPa (G), and the pressure in the vessel at the time of expansion was regulated to 1.7 MPa (G). A ratio of the weight of the polymer particles to the weight of water is 0.33.

Example 6

Expanded beads and an expanded beads molded article were produced in the same manners as in Example 5, except that on the occasion of producing expanded beads, $CO_2$ as the blowing agent at a pressure of 1.5 MPa (G) was charged, and the pressure in the vessel at the time of expansion was regulated to 3.5 MPa (G).

Example 7

Expanded beads were obtained in the same operation as in Example 1, except for changing the cell controlling agent to 3,000 ppm by weight of a powder of polytetrafluoroethylene (PTFE) (a trade name: TFW-1000, manufactured by Seishin Enterprise Co., Ltd., average particle diameter: 10 μm) and the addition amount of the crosslinking agent to 0.8 part by weight, respectively and regulating the pressure in the vessel at the time of expansion to 1.7 MPa (G), and then molded under the condition as shown in Table 1, thereby producing an expanded beads molded article.

Example 8

Production of Particles of Block Copolymer (I)

Using, as a block copolymer (I), an ethylene/α-olefin multi-block copolymer (INFUSE 9500, manufactured by The Dow Chemical Company) having a melting point of 120° C., a melt flow rate of 6.0 g/10 min (at 190° C. and a load of 2.16 kg), a density of 887 kg/m$^3$, a type A durometer hardness of 76, a flexural modulus of 13 MPa, and a modulus of repulsion elasticity of 57% and having a polyethylene block and an ethylene/α-olefin copolymer block, 1,000 ppm by weight of zinc borate (manufactured by Tomita Pharmaceutical Co., Ltd., Zinc Borate 2335, average particle diameter: 6 μm) as a cell controlling agent was added to 100 parts by weight of the multi-block copolymer, and the contents were put into an extruder and melt kneaded. The resultant was extruded in a strand form from a φ2-mm die, cooled in water, and then cut in a particle weight of approximately 5 mg by using a pelletizer, followed by granulation to obtain resin particles of the block copolymer (I).

Production of Expanded Beads

Expanded beads were obtained in the same manner as in Example 5, except that the resulting resin particles of the block copolymer (I) were used, and in the production condition on the occasion of producing expanded beads, $CO_2$ as the blowing agent at a pressure of 1.6 MPa (G) was charged, and the pressure in the vessel at the time of expansion was regulated to 4.0 MPa (G).

Production of Expanded Beads Molded Article

The resulting expanded beads were charged in a closed vessel and pressurized with compressed air of 0.2 MPa (G) for 12 hours to impart an internal pressure of 0.10 MPa (G) within the expanded beads. After taking out the expanded beads having an internal pressure imparted thereto, in-mold molding was performed in such a manner that the taken-out expanded beads were filled in a flat plate mold having a length of 250 mm, a width of 200 mm, and a thickness of 20 mm such that a ratio of cracking was 20%; the mold was closed, heated with steam of 0.12 MPa (G), and then cooled, followed by taking out a molded article from the mold.

Furthermore, the expanded beads molded article was heated for drying and aged within an oven adjusted at 60° C. for 12 hours and then taken out, thereby obtaining an expanded beads molded article. The molding density of the resulting molded article, the physical properties of the molded article, the properties of the expanded beads, the various conditions, and the like are shown in Table 1.

Comparative Example 1

Expanded beads were produced in the same manner as in Example 1, except that on the occasion of producing expanded beads, the charged amount of the polymer particles was changed to 5 kg. Using the resulting expanded beads, in-mold molding was performed in the same operation as in Example 1. A ratio of the weight of the polymer particles to the weight of water is 0.025. The resulting expanded beads were inferior in fusion bondability, and a molding with excellent restorability could not be obtained. In addition, even when the molding pressure was changed in a range of 0.16 to 0.24 MPa (G), a favorable expanded beads molded article was not obtained. It may be conjectured that the ratio of the xylene insoluble fraction between the surface layer and the interior was large, the crosslinkage was formed biased toward the surface layer rather than the interior of the expanded bead, and the degree of crosslinking of the interior was too low, so that the restorability was worsened.

Comparative Example 2

Expanded beads were produced in the same operation as in Comparative Example 1, except that on the occasion of producing expanded beads, the amount of dicumyl peroxide as the crosslinking agent was changed to 0.8 part by weight based on 100 parts by weight of the polymer particles. In-mold molding was performed in the same operation as in Comparative Example 1. As a result, the fusion bondability and the restorability were inferior, so that a favorable molding could not be obtained. In addition, even when the molding pressure was changed in a range of 0.16 to 0.24 MPa (G), a favorable expanded beads molded article was not obtained. It may be conjectured that the ratio of the xylene insoluble fraction between the surface layer and the interior was large, the crosslinkage was formed biased toward the surface layer rather than the interior of the expanded bead, and the degree of crosslinking of the surface layer was too high, so that the fusion bondability was worsened.

Comparative Example 3

Expanded beads were produced in the same operation as in Comparative Example 1, except that on the occasion of producing expanded beads, the amount of dicumyl peroxide as the crosslinking agent was changed to 0.9 part by weight based on 100 parts by weight of the polymer particles. In addition, in-mold molding was performed in the same operation as in Comparative Example 1. As a result, the fusion bondability and the appearance due to the secondary expandability were inferior, and a favorable molding could not be obtained. In addition, even when the molding pressure was changed in a range of 0.16 to 0.24 MPa (G), a favorable expanded beads molded article was not obtained. As for the reason for this, there is exemplified the matter that the xylene insoluble fraction (A) became higher as compared with Comparative Example 2, and therefore, it became difficult to perform fusion bonding.

TABLE 1

| | | | Example 1 | Example 2 | Example 3 | Example 4 | Example 5 | Example 6 |
|---|---|---|---|---|---|---|---|---|
| Production condition of expanded beads | Block copolymer (I) | — | 9530 | 9530 | 9530 | 9530 | 9530 | 9530 |
| | Cell controlling agent | Kind | ZnB | ZnB | ZnB | ZnB | ZnB | ZnB |
| | Addition amount of cell controlling agent | ppm by weight | 1000 | 1000 | 1000 | 1000 | 1000 | 1000 |
| | Addition amount of crosslinking agent | part by weight (phr) | 0.700 | 0.600 | 0.800 | 0.700 | 0.800 | 0.800 |
| | Kind of blowing agent | — | $CO_2$ | $CO_2$ | $CO_2$ | $CO_2$ | $CO_2$ | $CO_2$ |
| | Initial amount of blowing agent | MPa (G) | 0.4 | 1.4 | 1.6 | 1.4 | 0.4 | 1.5 |
| | Impregnation temperature of crosslinking agent | °C. | 110 | 110 | 110 | 110 | 110 | 110 |
| | Crosslinking temperature | °C. | 160 | 160 | 160 | 160 | 160 | 160 |
| | Expansion temperature | °C. | 160 | 160 | 160 | 160 | 160 | 160 |
| | Equilibrium vapor pressure | MPa (G) | 1.9 | 2.6 | 4.0 | 2.6 | 1.7 | 3.5 |
| Expanded beads | Apparent density | kg/m³ | 150 | 113 | 75 | 96 | 156 | 96 |
| | Average cell diameter | μm | 105 | 92 | 81 | 88 | 165 | 116 |
| | Xylene insoluble fraction (A) | wt % | 53.0 | 41.2 | 62.6 | 47.2 | 40.4 | 43.7 |
| | Xylene insoluble fraction (B) | wt % | 52.3 | 39.9 | 60.3 | 45.0 | 40.0 | 42.7 |
| | A/B | — | — | 1.01 | 1.03 | 1.04 | 1.05 | 1.01 | 1.02 |
| | Degree of swelling (S) | — | 49 | 61 | 37 | 56 | 71 | 65 |
| Molding condition | Internal pressure | MPa (G) | 0.1 | 0.1 | 0.1 | 0.1 | 0.1 | 0.1 |
| | Ratio of cracking | % | 20 | 20 | 20 | 20 | 20 | 20 |
| | Molding pressure | MPa (G) | 0.2 | 0.2 | 0.2 | 0.2 | 0.2 | 0.2 |
| Expanded beads molded article | Molding density | kg/m³ | 125 | 88 | 50 | 62 | 107 | 62 |
| | Restorability (thickness ratio*¹) | % | 100 | 96 | 100 | 99 | 97 | 96 |
| | Tensile elongation | % | 163 | 192 | 120 | 183 | 225 | 202 |
| | Appearance (void) | — | A | A | A | A | A | A |
| | Moldable temperature | — | A | B1 | C | B1 | B1 | B1 |

| | | | Example 7 | Example 8 | Comparative Example 1 | Comparative Example 2 | Comparative Example 3 |
|---|---|---|---|---|---|---|---|
| Production condition of expanded beads | Block copolymer (I) | — | 9530 | 9500 | 9530 | 9530 | 9530 |
| | Cell controlling agent | Kind | PTFE | ZnB | ZnB | ZnB | ZnB |
| | Addition amount of cell controlling agent | ppm by weight | 3000 | 1000 | 1000 | 1000 | 1000 |
| | Addition amount of crosslinking agent | part by weight (phr) | 0.800 | 0.800 | 0.700 | 0.800 | 0.900 |
| | Kind of blowing agent | — | $CO_2$ | $CO_2$ | $CO_2$ | $CO_2$ | $CO_2$ |
| | Initial amount of blowing agent | MPa (G) | 0.4 | 1.6 | 1.1 | 1.1 | 1.1 |
| | Impregnation temperature of crosslinking agent | °C. | 110 | 110 | 110 | 110 | 110 |
| | Crosslinking temperature | °C. | 160 | 160 | 160 | 160 | 160 |
| | Expansion temperature | °C. | 160 | 160 | 160 | 160 | 160 |
| | Equilibrium vapor pressure | MPa (G) | 1.7 | 4.0 | 2.6 | 2.6 | 2.6 |
| Expanded beads | Apparent density | kg/m³ | 215 | 100 | 130 | 147 | 167 |
| | Average cell diameter | μm | 138 | 124 | 120 | 116 | 120 |
| | Xylene insoluble fraction (A) | wt % | 50.0 | 52.6 | 40.6 | 50.0 | 61.0 |
| | Xylene insoluble fraction (B) | wt % | 48.1 | 49.0 | 35 | 41.3 | 41.8 |
| | A/B | — | 1.04 | 1.07 | 1.16 | 1.21 | 1.46 |
| | Degree of swelling (S) | — | 49 | 48 | 53 | 39 | 26 |
| Molding condition | Internal pressure | MPa (G) | 0.1 | 0.1 | 0.1 | 0.1 | 0.1 |
| | Ratio of cracking | % | 20 | 20 | 20 | 20 | 20 |
| | Molding pressure | MPa (G) | 0.2 | 0.12 | 0.2 | 0.2 | 0.2 |
| Expanded beads molded article | Molding density | kg/m³ | 166 | 87 | 103 | 122 | 137 |
| | Restorability (thickness ratio*¹) | % | 100 | 97 | 85 | 90 | 92 |
| | Tensile elongation | % | 171 | 175 | 104 | 105 | 50 |
| | Appearance (void) | — | A | A | A | C | C |
| | Moldable temperature | — | B1 | — | D | D | D |

*¹(Thickness of central part of molded article)/(Thickness of edge part of molded article) × 100

It was noted from the evaluation results of Examples 1 to 8, by regulating the expanded beads produced by crosslinking and expanding particles of a block copolymer of a polyethylene block and an ethylene/α-olefin copolymer block such that a xylene insoluble fraction (A) by a hot xylene extraction method is 30 to 70% by weight, and that a ratio (A/B) of the xylene insoluble fraction (A) to a xylene insoluble fraction (B) of the expanded beads by a hot xylene extraction method when divided into two equal parts and measured is 1.0 to 1.1, an expanded beads molded article which is excellent in fusion bondability, restorability, appearance, and tensile elongation at break can be produced in in-mold molding.

On the other hand, in Comparative Examples 1 to 3, the ratio of the xylene insoluble fraction (A) of the expanded beads to the xylene insoluble fraction (B) of the expanded beads when divided into two equal parts is more than 1.1, a molded article satisfying both the fusion bondability and the restorability could not be obtained due to ununiformity in the degree of crosslinking between the surface layer and the interior of the expanded bead.

The expanded beads of the present invention are excellent in moldability, from which an expanded beads molded article with favorable fusion bondability and restorability is obtained and can be suitably utilized for a seat cushioning material, a pad material for sporting, a shoe sole material, and the like.

The invention claimed is:

1. An expanded beads molded article, which is obtained by molding expanded beads in a mold, wherein a molding density of the expanded beads molded article is from 40 to 300 kg/m$^3$, and a tensile elongation is from 120 to 500%,
    wherein the expanded beads comprise a block copolymer of a polyethylene block and an ethylene/α-olefin copolymer block, wherein
    a flexural modulus of the block copolymer is from 10 to 50 MPa,
    a xylene insoluble fraction (A) of the expanded beads by a hot xylene extraction method is from 10 to 70% by weight, and
    a ratio (A/B) of the xylene insoluble fraction (A) to a xylene insoluble fraction (B) of the expanded beads by a hot xylene extraction method when divided into two equal parts and measured is from 1.0 to 1.1.

2. The expanded beads molded article according to claim 1, wherein an apparent density of the expanded beads is from 30 to 500 kg/m$^3$.

3. The expanded beads molded article according to claim 1, wherein an average cell diameter of the expanded beads is from 50 to 180 μm.

4. The expanded beads molded article according to claim 1, wherein a degree of swelling of the expanded beads by hot xylene extraction is a weight ratio equal to 35 to 80, wherein the weight ratio is calculated by residue weight by hot xylene extraction divided by dry product weight.

5. The expanded beads molded article according to claim 1, wherein the xylene insoluble fraction (A) of the expanded beads by a hot xylene extraction method is from 30 to 70% by weight.

6. The expanded beads molded article according to claim 1, wherein the block copolymer has a multi-block structure.

7. The expanded beads molded article according to claim 1, wherein a proportion of the ethylene/α-olefin copolymer block in the block copolymer is from 5 to 95% by weight.

* * * * *